No. 634,820. Patented Oct. 10, 1899.
A. B. HENRY & T. F. MULLIN.
PIPE COUPLING.
(Application filed Apr. 5, 1899.)
(No Model.)
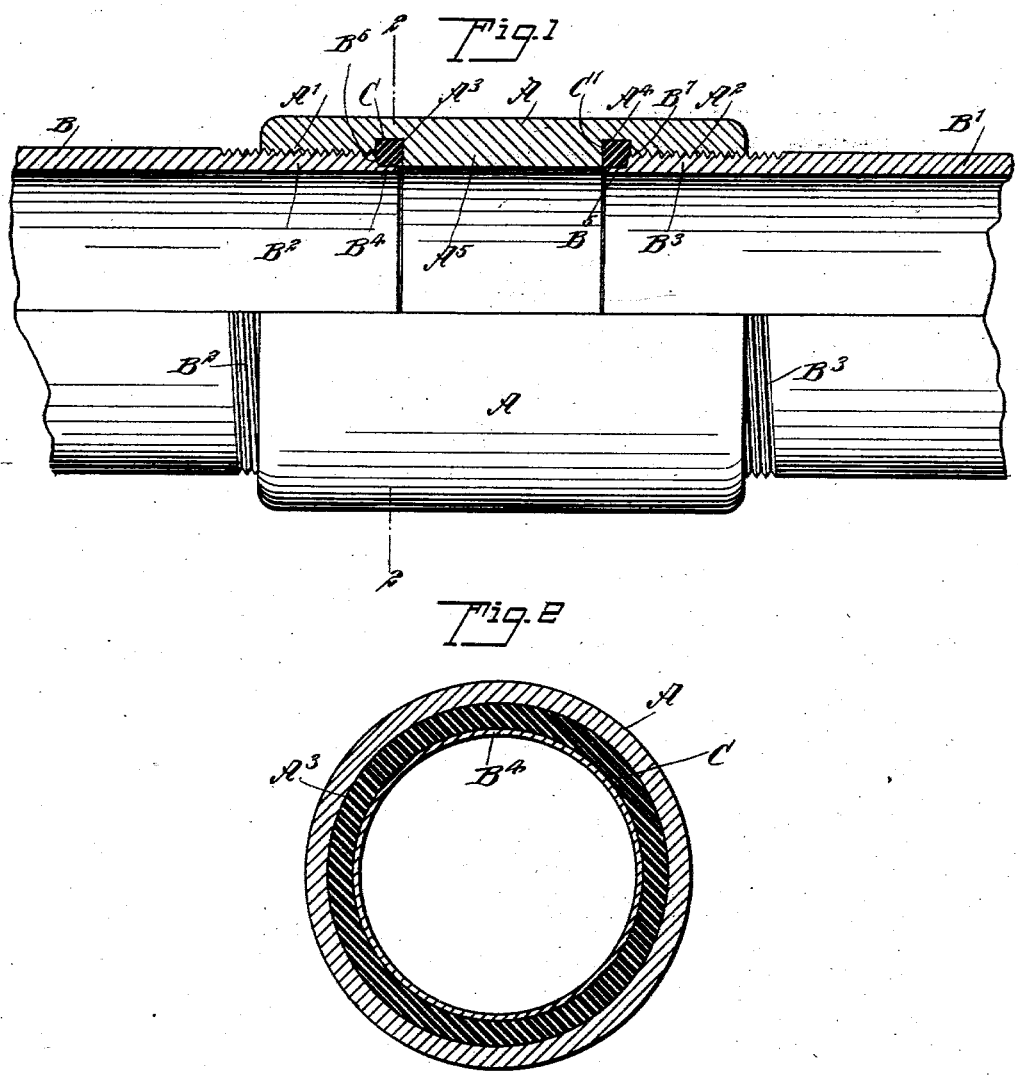
WITNESSES:
INVENTORS
Arthur B. Henry.
Timothy F. Mullin.
BY
ATTORNEYS.

UNITED STATES PATENT OFFICE.

ARTHUR B. HENRY, OF ORMSBY, AND TIMOTHY F. MULLIN, OF BRADFORD, PENNSYLVANIA.

PIPE-COUPLING.

SPECIFICATION forming part of Letters Patent No. 634,820, dated October 10, 1899.

Application filed April 5, 1899. Serial No. 711,805. (No model.)

*To all whom it may concern:*

Be it known that we, ARTHUR B. HENRY, of Ormsby, and TIMOTHY F. MULLIN, of Bradford, in the county of McKean and State of Pennsylvania, have invented a new and Improved Pipe-Coupling, of which the following is a full, clear, and exact description.

The object of the invention is to provide a new and improved coupling or joint for pipes used for conducting oil, gas, steam, water, or other gaseous or liquid fluids and arranged to prevent leakage upon expansion and contraction of the pipe and to avoid injury to the packing by the corrosive action of the fluid passing through the coupling.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in both the views.

Figure 1 is a sectional side elevation of the improvement, and Fig. 2 is a transverse section of the same on the line 2 2 in Fig. 1.

The improved pipe-coupling is provided with a coupling-sleeve A, formed at its ends with internally-threaded sections $A'$ $A^2$, adapted to receive the externally-threaded ends $B^2$ $B^3$ of the pipes B B' to be coupled together by the sleeve, as indicated in Fig. 1. The sleeve A is formed at the inner ends of the threaded sections $A'$ $A^2$ with annular grooves $A^3$ $A^4$, respectively, of a depth somewhat more than the depth of the threads in the sections $A'$ $A^2$, as is plainly indicated in Fig. 1.

In the grooves $A^3$ $A^4$ are placed the packing-rings C C', respectively, of rubber, rubber composition, or other suitable material, according to the nature of the fluid passing through the pipe. The inner edges of said packing-rings rest against shoulders formed by the ends of the inner middle part $A^5$ of the sleeve, and the inner faces of said packing-rings are adapted to be engaged by annular flanges $B^4$ $B^5$ formed on the ends of the pipes B B' next to the threads $B^2$ $B^3$ by reducing the ends to leave annular shoulders $B^6$ $B^7$ for engaging the outer side edges of the packing-rings C C'. It is evident that when the sleeve A is provided with the packing-rings C C' and the corresponding pipe B or B' is screwed into its threaded section $A'$ or $A^2$ of the said sleeve, then the annular flange $B^4$ or $B^5$ finally passes into the opening of the corresponding packing-ring, and the corresponding shoulder $B^6$ or $B^7$ finally engages and presses the outer edge of the packing-ring to compress the same in the annular groove $A^3$ or $A^4$ and force the packing-ring material against the annular flange $B^4$ or $B^5$ to form a very secure joint between the inner ends of the pipes and the sleeve, so that no leakage is liable to take place.

From the foregoing it is evident that the packing-rings do not project inside into the coupling or the pipes, and hence do not form any obstruction for the free passage of the fluid, and expansion or contraction of the pipes does not affect the packing-rings to such an extent as to cause leakage. Furthermore, the packing-rings are out of reach of the fluid passing through the coupling, so that all possible corrosive action of the fluid on the packing-rings is completely avoided.

Having thus fully described our invention, we claim as new and desire to secure by Letters Patent—

1. A pipe-coupling, comprising a coupling-sleeve having internally-threaded end sections and an intermediate smooth section, annular grooves at the inner ends of the said threaded sections, for the reception of packing-rings, pipes screwing into said threaded end sections of the sleeve and having their ends reduced to form annular flanges for fitting into the packing-rings, and shoulders for abutting against and pressing the outer side edges of the packing-rings, substantially as shown and described.

2. A pipe-coupling, comprising a coupling-sleeve having internally-threaded end sections, annular grooves at the inner ends of said threaded sections for the reception of packing-rings, shoulders for the inner edges of the packing-rings to abut against, pipes screwing in the threaded end sections and having their ends reduced to form annular flanges for fitting into the packing-rings, and shoulders for abutting against and pressing the outer side edges of the packing-rings, substantially as shown and described.

ARTHUR B. HENRY.
TIMOTHY F. MULLIN.

Witnesses:
E. W. MULLIN,
J. MARSHALL.